May 29, 1934.                    G. P. LUCKEY                    1,960,745
                              MEASURING INSTRUMENT
                              Filed July 15, 1930
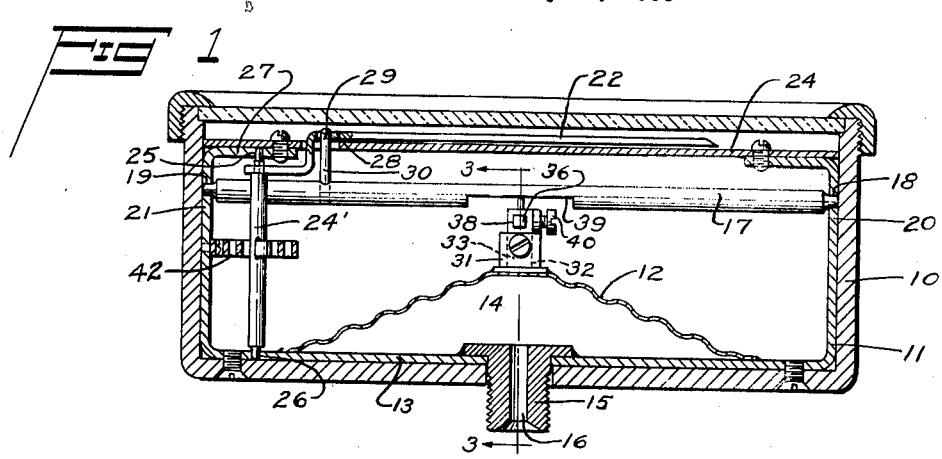
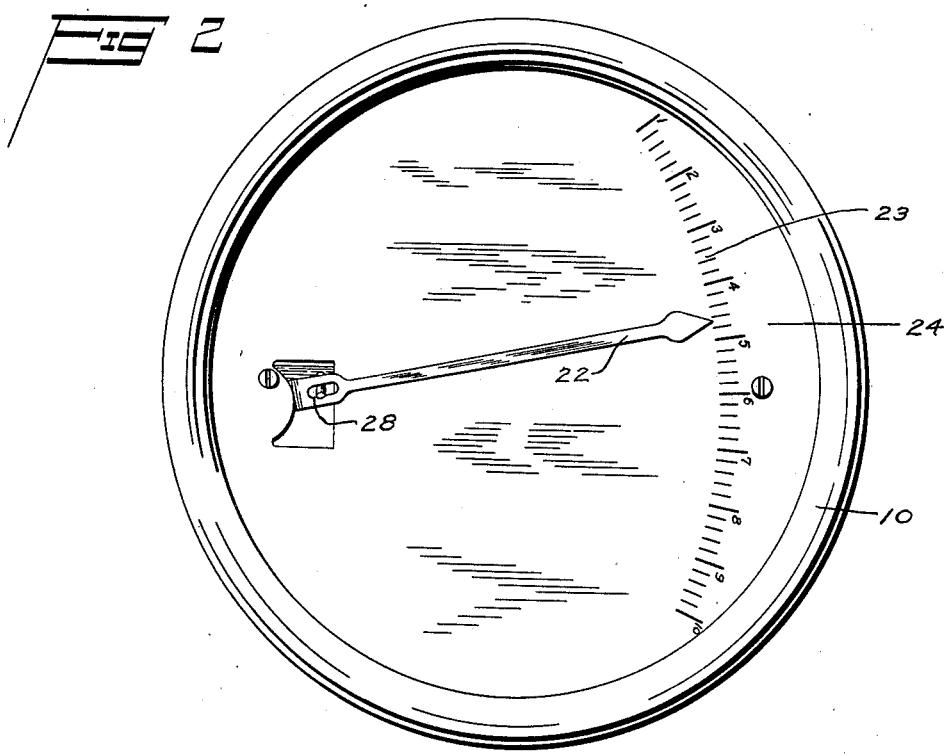
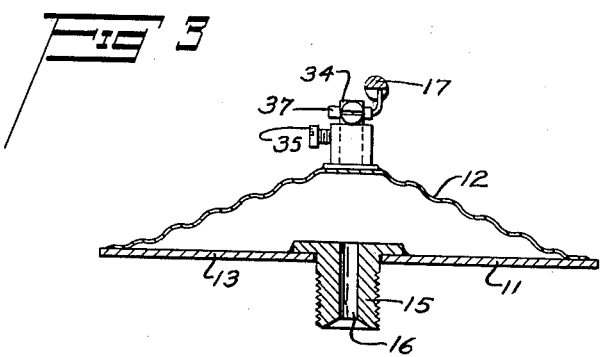
INVENTOR
George P Luckey.
BY
Robert H. Young
ATTORNEY Patented May 29, 1934

1,960,745

UNITED STATES PATENT OFFICE 1,960,745

MEASURING INSTRUMENT

George P. Luckey, Lancaster, Pa.

Application July 15, 1930, Serial No. 468,152

5 Claims. (Cl. 73—110)

The invention described herein may be manufactured and used by or for the Government for governmental purposes, without the payment to me of any royalty thereon.

The present invention relates generally to improvement in measuring instruments and more particularly to measuring instruments of the type in which an indicating band or pointer cooperates with a scale which is graduated or arranged in accordance with the class of measuring for which the instrument is intended.

One of the primary objects of the present invention is to produce a measuring instrument which is of compact construction and which, though extremely accurate and sensitive for ranges of low as well as high pressure is reduced to its simplest form.

A further object of the present invention is to produce an instrument of the type indicated wherein all the complicated mechanism involved in instruments of this class has been substantially eliminated.

The invention is further characterized by the provision of a measuring instrument which is economical of manufacture due to its simple construction and yet, wherein its efficiency in operation is not impaired by its simplicity but rather improves its durability. Furthermore, it is exceedingly insusceptible to any derangement of its parts resulting from shock or other extraneous causes.

The invention also consists in certain other features of construction and in the combination and arrangement of the several parts to be hereinafter fully described, pointed out in the appended claims, and illustrated in the accompanying drawing, in which Fig. 1 is a cross sectional view of my invention and illustrates the interior mechanism of the same.

Fig. 2 is a front view of my invention ready for use.

Fig. 3 is a detail view of the calibrating device which is used for adjusting the instrument in accordance with its scale.

Referring more particularly to the drawing wherein corresponding numerals are used to indicate like parts throughout the various figures, the measuring instrument in the embodiment of my invention herein illustrated comprises generally a casing 10 for the instrument. Centrally disposed within this case is a base member 11 formed of a single piece of thin material. The base member is adapted to carry a cone-shaped diaphragm 12 which may be corrugated as shown and which is attached at its edges by soldering or other suitable means to a circular portion 13 provided on the base member 11. When so attached, a chamber 14 is thus formed between the diaphragm and base member. The base member is also provided with a threaded nipple 15 and an opening 16 therein which communicates with the chamber 14 and which, in turn, is adapted to be placed in communication with a source of pressure to be measured.

The instrument includes a rock shaft 17, journaled in suitable bearings 18 and 19 provided in end plates 20 and 21 respectively which are formed on opposite sides of the base member 11 as shown in Fig. 1, said rock shaft being so mounted as to extend over the diaphragm 12.

The instrument is also provided with a pointer 22 adapted to register over a scale 23 provided on a dial 24 which is mounted on the inturned ends of the plates 20 and 21 as shown in Fig. 1. This pointer is carried on a shaft 24' journaled in bearings 26 and 25 which are provided in the base member 11 and a continuing portion 27 respectively, said portion being integral with and bent at right angles to the end plate 21; thus forming upper and lower bearing plates. The shaft 24' is mounted at right angles to the drive shaft as will be noted by referring to Fig. 1. The pointer is formed with an elongated slotted opening 28 within which the free end 29 of a finger member 30 carried by the rock shaft 17 is adapted to operate. It will be noted from Fig. 1 that in order for the pointer to register on the face of the dial 24, I have provided an opening in the dial through which the pointer extends. From the foregoing description and by referring to Fig. 1, it will be apparent that as the finger member 30 is moved slowly back and forth by impulses received from the diaphragm through its connection with the rock shaft 17, the free end 29 of the finger member 30 will actuate the pointer and cause it to move circumferentially over the scale on the dial.

Mounted upon and disposed centrally of the diaphragm 12, where the movement of the diaphragm in expanding or contracting is greatest is a calibrating device which is for the purpose of adjusting the instrument to indicate correctly the pressure being measured without the necessity of changing the scale of the dial for different pressure ranges. Any type of means may be provided in order to bring about this desired result but in the form of the invention herein illustrated, the device is shown as comprising a bearing block 31 having a squared opening 32 within which is adjustably mounted the squared shank 33 of an arm carrying member 34 adapted for actuating the rock shaft 17. The movement of the arm carrying member is governed through the medium of an adjusting screw 35 carried by the bearing block 31 for a purpose to be more fully described hereinafter.

The member 34 supports a motion control arm 36, the end of which, as shown by numeral 37, is of square cross section, is adapted for adjustable insertion in a squared opening 38 formed in the member 34. The free end of the motion control arm 36 is adapted to bear against the flattened portion 39 of the rock shaft 17 as shown in cross section in Fig. 3. From the foregoing, it is apparent that the motion control arm is adjustable toward and away from the axis of the rock shaft, the position of which is controlled through a screw 40 which projects through the head of the member 34 and which is in screw-threaded engagement therewith.

The adjustment of the screw 35 permits movement of the arm carrying member up or down to bring the pointer into proper register with the zero mark on the scale. The motion-control arm may be moved toward or away from the axis of the shaft 17 within the limits of its adjustment by loosening the screw 40 and moving the arm 36 nearer to or farther from the axis of rotation of the shaft; in this way the amount of rotation of the pointer may be increased or decreased as will be apparent. In other words, the farther away the motion-control arm is from the axis of rotation of the shaft 17, the smaller will be the movement of the pointer 22 through the medium of the diaphragm 12; on the other hand, the nearer the motion-control arm is to said axis of rotation, the greater will be the travel of the pointer, the degree of expansion of the diaphragm in both cases being constant.

My invention thus reduces the actuating mechanism to an extremely simple form and further avoids any positive connection between the pointer actuating means and the means for operating said actuating means and is itself actuated by the movement of the diaphragm.

From the foregoing description of the construction of my measuring instrument, it will be seen that I have provided simple, yet inexpensive and efficient means for carrying out the objects of my invention and, while I have particularly described the preferred embodiment of my invention best adapted to perform the function set forth, it is obvious that various changes in form, proportion, and in the minor details of construction may be had without departing from the spirit of the invention. I have used the numeral 42 to designate a spring for yieldingly holding a pointer 22 at a zero reading. This is accomplished by rigidly securing one end of the spring to the member 24' and its other end to the member 21 as shown in Fig. 1.

What I, therefore, claim as new and desire to secure by Letters Patent is:

1. An indicating instrument comprising a base member, a diaphragm mounted on said base member, a shaft journalled in said base member and arranged perpendicular to the base of said diaphragm, a pointer carried by said shaft, a rock shaft mounted for oscillatory movement and disposed at right angles to said pointer shaft, a finger fixed to said rock shaft and cooperating with a slot in said pointer for transmitting the movement of said rock shaft to said pointer, an arm carried by said diaphragm the free end of which is in engagement with said rock shaft for transmitting motion from said diaphragm to said rock shaft, said arm being adjustable with respect to said diaphragm so that the free end thereof may be movable toward and from the axis of rotation of said rock shaft to vary the speed of travel of said pointer.

2. An indicating instrument comprising a casing, a dial carried thereby having a scale thereon, a base member in said casing, a diaphragm carried by said base member, a shaft journaled in said base member and disposed perpendicular with respect to the base of said diaphragm, a pointer formed with an elongated slot carried by said shaft and cooperating with said scale, a rock shaft having a flattened portion intermediate its ends mounted for oscillatory movement and disposed at right angles to said pointer shaft, a finger fixed to said rock shaft and engaging with the slot in said pointer to move said pointer angularly, and means to adjust the pointer to correspond exactly with the zero setting of the scale on said dial, said means comprising a support on said diaphragm, an arm adjustably carried by said support, the free end of said arm being in engagement with the flattened portion of said rock shaft and movable toward and away from the axis of said rock shaft, said support being adjustably mounted on said diaphragm whereby said support and the said arm may be raised or lowered relative to said rock shaft in adjusting said pointer to correspond with the zero setting on said scale.

3. An indicating instrument comprising a casing, a base member in said casing, a member having a scale carried by said base member, a diaphragm mounted on said base member, a rotatably mounted pointer for reading on said scale, a rotatable shaft mounted on said base member and above said diaphragm, means for operatively connecting said shaft to said pointer, said shaft having a flattened portion, and an actuating member adjustably carried by said diaphragm, the free end of said actuating member being adjustable in a direction transverse to the flattened portion of said shaft to thereby engage said flattened portion at various points at one side of the longitudinal dead center line of said shaft and rotate said shaft when said diaphragm expands.

4. An indicating instrument comprising a casing, a base member in said casing, a dial carried by said base member, a diaphragm mounted on said base member, a rotatably mounted pointer for reading on said scale, a means for yieldingly holding said pointer in one direction, a rotatable shaft mounted on said base member and above said diaphragm, a means for operatively connecting said shaft to said pointer, said shaft having a flattened portion, and an actuating member slidably secured to said diaphragm, the free end of said actuating member being adjustable in a direction transverse to the flattened portion of said shaft and engaging said flattened portion at various points on one side of the longitudinal dead center line of said shaft to rotate said shaft when said diaphragm expands.

5. An indicating instrument comprising a casing, a base member in said casing, a dial carried thereby and having a scale thereon, a diaphragm mounted on said base member, a rotatable shaft mounted on said base member positioned above said diaphragm and having a flattened portion in its length, a rotatably mounted pointer for reading on said scale operatively connected to said shaft, an actuating member slidably secured to said diaphragm the free end of which is capable of being adjustably slid toward or away from the flattened portion of said shaft, said actuating member being provided with a locking screw for rigidly securing said actuating member at various points of its adjustment.

GEORGE P. LUCKEY.